UNITED STATES PATENT OFFICE.

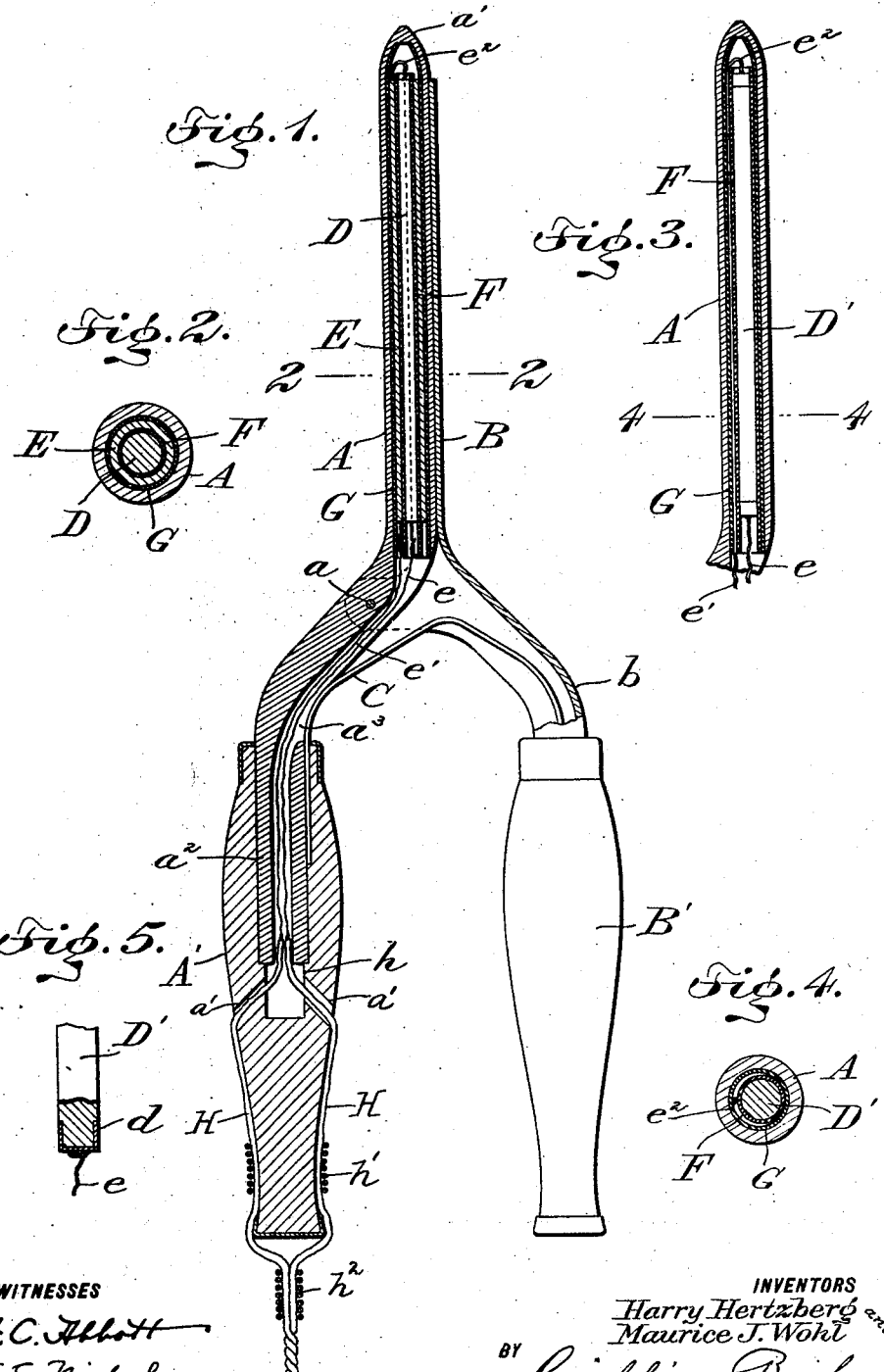

HARRY HERTZBERG AND MAURICE J. WOHL, OF NEW YORK, N. Y., ASSIGNORS TO ECONOMY ELECTRIC COMPANY, OF BROOKLYN, NEW YORK, A CORPORATION OF NEW YORK.

ELECTRICALLY-HEATED CURLING-IRON.

No. 900,732.   Specification of Letters Patent.   Patented Oct. 13, 1908.

Application filed April 18, 1907. Serial No. 368,836.

*To all whom it may concern:*

Be it known that we, HARRY HERTZBERG and MAURICE J. WOHL, citizens of the United States, residing at the city of New York, borough of Brooklyn, and State of New York, have invented a certain new and useful Electrically - Heated Curling - Iron, of which the following is a specification.

This invention is a curling iron adapted for use by men and women in curling the hair.

According to our invention we provide means for electrically heating one leg of the iron. Said electrical heating means is exceedingly compact in construction for the purpose of incasing it within a hollow leg, whereby the size of the leg of the new iron may be same as standard devices, and, in fact, the electrically heated iron resembles, for all practical purposes, other styles of curling irons.

The heating appliance of this invention transmits the heat developed by a current in an electrical resistance directly to the mass of metal forming the hollow or tubular leg of the iron, whereby economy in the consumption of the electric current is secured. Said heating appliance is insulated electrically from the parts of the device in order that it may be handled and used with perfect safety.

In the accompanying drawings, we have illustrated one practical embodiment of the invention, but the construction shown therein is to be understood as illustrative only, and not as defining the limits of the invention.

Figure 1 is a longitudinal section, partly in elevation, of a curling iron provided with means for electrically heating one of the legs thereof as contemplated by this invention. Fig. 2 is a vertical cross section, on an enlarged scale, through the tubular leg which contains the electric heating appliance of our invention, the plane of the section being indicated by the dotted line 2—2 of Fig. 1. Fig. 3 is a longitudinal section through a hollow leg equipped with a modified form of electric heater. Fig. 4 is a cross section on the line 4—4 of Fig. 3. Fig. 5 is a detail view of a portion of an electrical resistance employed in the heating appliance shown in Figs. 3 and 4.

In Fig. 1 of the drawings we have shown a curling iron consisting of the legs, A, B, which are pivoted together by a pin, $a$, for the purpose of securing a relative movement of the legs one to the other. The leg, A, is preferably tubular, said leg being closed at one end by a tip, $a'$, and having at its other end a hollow shank, $a^2$, on which is secured a handle, A'. The other leg, B, is preferably trough shaped in cross section in order that it may fit part way around the hollow leg, A. Said leg, B, is provided at one end with a shank, $b$, on which is secured a handle, B'. The legs are pressed together by the action of a suitable spring, the same being shown in Fig. 1 as a leaf or bowed spring, C, which is arranged between the shanks, $b$, $a^2$, of the respective legs, the end portions of said spring being secured within the handles, A', B'.

The construction of the appliance as thus far described, except for the hollow or tubular leg, A, is similar to an ordinary or standard curling iron, and in this connection it may be stated that one object which we have in view is to provide a new form of electric heater which is adapted for use in connection with the hollow leg in such a manner as to avoid increasing the size of said hollow leg, whereby a curling iron embodying this invention resembles ordinary or standard devices except for the conductors which are employed for conveying an electric current to and from the heater.

The electrical heating appliance of this invention contemplates the employment of an electrical resistance which consists of a core or pencil composed, preferably, of carbon indicated at D in Figs. 1 and 2. The electrical resistance, however, may be composed of material other than carbon, and in some instances we may employ a wire or ribbon, but for compactness, durability and economy we prefer to employ a carbon pencil of very small diameter. Said pencil extends longitudinally within the hollow leg, A, and to one end of said pencil there is connected an electric conductor, $e$. To the other end of said resistance formed by the carbon pencil there is connected a short wire, $e^2$, which, in the embodiment of the invention represented by Figs. 1 and 2, is connected to a return tube, E, said tube being composed of copper or other good conducting material. The metallic return tube, E, is somewhat larger in diameter than the carbon pencil, D, and the tube is concentric with said pencil, said tube extending longitudinally within the hollow leg, A. The concentric pencil and the metallic tube are insulated electrically one from the other by a tubular layer, F, composed of insulating material, such as mica, and the return tube, E, is also insulated electrically from the hollow leg, A, by another tubular layer, G, of insulating material, such as mica.

It will be observed that the inner ends of the carbon pencil, D, and the metallic tube, E, are connected electrically in series by the conductor, $e^2$, and furthermore, that a supply conductor, $e$, is attached to the outer end of the carbon pencil. The current is conveyed from the electric heater by a return conductor, $e'$, which is attached to the inner end of the metallic tube, E, and said conductors, $e$, $e'$, are arranged within a recess, $a^3$, of the shank, $a^2$, forming a part of the hollow leg, A. The conductors, $e$, $e'$, run through the hollow shank, $a^2$, into a cavity, $h$, of the handle, A', and through transverse openings $a'$, of the handle run the insulated wires H, the latter being fastened by a tie $h'$ to the handle, said conductors being also fastened together at $h^2$, whereby the conductors are united to the handle by flexible ties which prevent the conductors from straining the resistance. Said wires H, are united to the wires $e$, $e'$, of the resistance and thus the wires H are attached to the hollow handle, A', and the conductors are connected electrically with the leading wires by which the current is supplied to the heating appliance within the hollow leg of the curling iron.

A modified construction of the heater is shown in Figs. 3, 4, and 5 of the drawings, wherein we contemplate the employment of an electrical resistance in the form of a pencil of carbon or other suitable material indicated at D'. For the purpose of securing good metallic contact between the material of the pencil and the electrical conductors, $e$, $e^2$, we provide said pencil with metallic tips, $d$, the latter being preferably electroplated on the end portions of the carbon rod, D'. As a matter of fact the carbon pencil, D', of Figs. 3, 4, and 5 may be employed in lieu of the carbon pencil, D, in the heater of Figs. 1 and 2, whereby the conductors $e$, $e^2$, may be attached to the material of the resistance in a manner to secure good electrical contact therewith. Instead of using a metallic tube as the return lead for the conductor $e^2$, in the construction of the heater shown in Figs. 1 and 2, we extend the wire, $e^2$, from the inner end of the resistance pencil, D', in parallel relation to said pencil as shown in Figs. 3 and 4. The return wire, $e^2$, thus extends lengthwise within the hollow leg, A, and said return wire, $e^2$, is joined to the conductor, $e'$. The return lead or wire, $e^2$, is insulated electrically from the carbon pencil, D', by a tubular layer, F, of insulating material, and said return lead or wire, $e^2$, is furthermore insulated electrically from metallic contact with the hollow leg, A, by the other tubular layer, G, composed also of insulating material.

In the manufacture of the electric heater shown in Figs. 1 and 2 we first prepare the resistance pencil, D, of the proper length and diameter, or we may employ the capped resistance pencil, D', of Figs. 3 and 5. The pencil is incased within the layer, F, of insulating material, and around this layer is applied the metallic tube or sleeve, E. The next insulating layer, G, is now fitted around the metallic sleeve or tube, and the conductor, $e^2$, having been attached to the inner ends of the pencil and the metallic sleeve, the heater is in a condition to be slipped endwise within the hollow leg, A, of the curling iron.

The procedure adopted in assembling the parts of the heater shown in Figs. 3, 4, and 5 is similar to that described in Figs. 1 and 2 except that we incase the return wire, $e^2$, between the insulating layers, F, G, of the heater.

We prefer to employ mica as the material for the manufacture of the tubular insulating layers, F, G, for the reason that this material may be used in very thin sheets or layers, it effectually insulates the resistance pencil from the metallic sleeve or the return wire, and permits the heat developed in the resistance by the passage of an electric current therethrough to be transmitted directly to the hollow leg which is composed of a mass of heat absorbing metal, such for example as copper.

The operation of the invention will be readily understood from the foregoing description taken in connection with the drawings. An electric current is conveyed to the resistance by the wire, $e$, and is returned through the wire, $e^2$, and the metallic tube or sleeve, or through the return lead of said wire. The heat developed by the electrical resistance is transmitted through the thin layers of insulating material directly to the mass of metal composing the leg, A. Our construction enables the metal leg to be heated very quickly to the required temperature within a short time and with a very small consumption of current. The legs of the curling iron may be opened by pressing the handles, A', B', toward each other in order that the hair to be curled may be wrapped or coiled on the leg, A, after which the spring, C, closes the trough shaped leg, B, upon the hair coiled on the leg, A.

It is evident that the legs may be opened for quickly removing the device from the curled hair.

Having thus fully described the invention, what we claim as new, and desire to secure by Letters Patent is:—

1. In an electrically heated tool, a pair of coöperating members, one of which is tubular, a resistance within said tubular member, a return tubular conductor incasing said resistance, said tubular conductor and the resistance being electrically connected at one end, and a plurality of insulations, one of which is between the resistance and the tubular conductor, and another being between the conductor and a wall of said tubular member.

2. As a new article of manufacture, a hair curler provided with a hollow leg composed of heat-absorbing metal, a resistance pencil extending lengthwise of and incased within said leg, a metallic tube incasing said pencil, an interposed electrical insulation between said tube and the pencil, an electrical connection between corresponding ends of the pencil and the metallic tube, and another electrical insulation between the metallic tube and the heat-absorbing metal of said hollow leg.

3. In a device of the class described, a resistance pencil, an independent metallic tube incasing said pencil and connected electrically therewith, whereby said tube is adapted to serve as a return conductor, and a tubular layer of insulating material between the pencil and the aforesaid tube.

4. In a device of the class described, a resistance pencil having metal capped ends, an independent tube of conducting material incasing said pencil and connected electrically to one of the capped ends thereof, and a tubular layer of insulating material between the pencil and the metallic tube.

5. In a device of the class described, two coöperating members, one of which is a hollow mass of heat absorbing metal, each of said members having a shank provided with a handle, an electrical resistance within the hollow member and electrically insulated therefrom, a cord anchored on the handle of one of said members, and leading wires connecting said cord with the respective ends of the resistance.

In testimony whereof we have signed our names to this specification in the presence of two subscribing witnesses.

HARRY HERTZBERG.
MAURICE J. WOHL.

Witnesses:
H. T. BERNHARD,
L. V. GLASS.